US005780370A

United States Patent [19]
Chen et al.

[11] Patent Number: 5,780,370
[45] Date of Patent: Jul. 14, 1998

[54] SELECTIVE INFRARED LINE EMITTERS

[75] Inventors: Zheng Chen, Auburn University; Millard Franklin Rose; Peter L. Adair, both of Auburn, all of Ala.

[73] Assignee: Auburn University, Auburn University, Ala.

[21] Appl. No.: 699,509

[22] Filed: Aug. 19, 1996

[51] Int. Cl.$^6$ ................................................. B32B 18/00
[52] U.S. Cl. .................... 442/414; 428/688; 428/178; 428/415; 428/311.51; 428/317.1; 442/415
[58] Field of Search ................................ 428/688, 178, 428/415, 311.51, 317.1; 442/414, 415

[56] References Cited

U.S. PATENT DOCUMENTS

| 5,041,321 | 8/1991 | Bendig | 428/102 |
| 5,447,786 | 9/1995 | Rose et al. | 428/229 |
| 5,569,343 | 10/1996 | Garrigus | 156/89 |
| 5,589,441 | 12/1996 | Baker et al. | 505/125 |
| 5,624,613 | 4/1997 | Rorabaugh et al. | 264/44 |
| 5,630,974 | 5/1997 | Rose et al. | 264/105 |

*Primary Examiner*—Kathleen Choi
*Attorney, Agent, or Firm*—Eugene I. Snyder

[57] ABSTRACT

Robust, large area selective infrared line emitters can be made using composites of rare earth metal oxide fibers dispersed and interlocked in a network of connected structure-forming fibers, especially alumina fibers, where the fibers are adhesively connected by a ceramic bonding agent. Articles where the composite is formed of rare earth metal oxide fibers in a network of alumina fibers and where the two types of fibers are connected by alumina a the ceramic bonding agent show narrow bandwidth emissions with good thermal conversion efficiencies and with improved tensile strength and lower brittleness than in the absence of the ceramic bonding agent.

24 Claims, No Drawings

SELECTIVE INFRARED LINE EMITTERS

The use of infrared heat sources for drying and enhancing chemical reactions in industrial processes is extensive. Typical industries which utilize infrared heating are the food, paper making, and textile industries; infrared heating is used as well as in electronic assembly lines and automotive paint drying. Infrared radiation is a secondary energy source; the primary energy source usually is fossil fuel whose energy of combustion (thermal energy) is ultimately converted to radiation in the infrared portion of the spectrum, although electrical energy also can be a primary energy source. Ancillary to energy conversion are several needs. The energy of combustion needs to be converted efficiently into infrared radiation. It also is desirable to have a narrow bandwidth of infrared radiation so that it may be utilized efficiently and selectively for the process in question. Closely related to this is the depth of penetration of infrared radiation which is desired in the particular processing step, since penetration depth is a function of wavelength. Two approaches to the latter would be to match the infrared emission to the detailed infrared absorption spectra for the process ingredients, or to dope the process constituents with inert materials having an absorption band matching the emitter. Our invention, and the subject matter of this application, relates to the conversion of thermal energy to infrared radiation of narrow bandwidth using robust, selective infrared line emitters. More particularly, our invention relates to the preparation of improved composites which serve as selective infrared line emitters but which, in contrast to prior art material, are structurally robust, i.e.,are capable of maintaining their structural integrity at high temperatures and under conditions including moderate vibration and impact, and which can be readily formed into arbitrary shapes.

The principles underlying our invention have been elaborated in U.S. Pat. No. 5,447,786, are summarized here for the reader's convenience, and are relatively well known within the theory of black-body radiation.[1] For a body in equilibrium with its environment the energy it emits must be equal to the radiation it is absorbing. Objects which are perfect absorbers of radiation are called ideal black-bodies and are approached by a cavity with insulating walls having a small orifice. When the cavity is heated the radiation it absorbs is an example of near-ideal black-body radiation; all real materials reflect part of the radiant energy incident upon them and emit less radiant energy than a black-body radiator at the same temperature. The total radiant power density from a black-body is given by the Stefan-Boltzmann equation as $$P = \sigma T^4$$

where P is the power density (in watts/m$^2$), $\sigma$ is the Stefan-Boltzmann constant, and T is the temperature in degrees Kelvin. For a non-black-body source, the above equation is modified by the hemispherical emissivity, $\epsilon$, according to the equation $P = \epsilon \sigma T^4$, where $\epsilon$ has a value between zero and one which accounts for the deviation from a perfect black-body source. The distribution between the radiant power density and wavelength of radiation is given by the Planck equation as:

$$P_\lambda = a\lambda^{-5}|e^{b/\lambda T} - 1|^{-1}$$

in which $P_\lambda$ is the spectral power per m$^2$ at the wavelength $\lambda$ and a, b are the first and second radiation constants, respectively.

[1] Black-body radiation occupies a prominent place in the development of modern, nonclassical physics, for it was here that the first definite failure of the old wave theory of light was found. In deducing the mathematical form of the energy distribution in black-body radiation Max Planck (who had been urged to pursue a musical career since physics was described as a closed subject in which new discoveries were unlikely) introduced the notion of discontinuity of energy through the relation E=hv, where E is the energy quantum associated with an oscillator of frequency v and h is Planck's constant.

Clearly the intensity of a given wavelength radiated by a black-body is a function of the temperature, and it is this temperature which also will determine the efficiency of selective line emitters. If the short wavelength cut-off of the black-body spectrum is at a wavelength longer than that required to excite a specific line radiator, there will be little or no emission from the sample. However, the intensity at a particular wavelength is exponential in temperature which should result in a strong temperature dependence for line emission. This in fact is what is observed. Certain rare earth oxides are theoretically capable of emitting as much as 70% of the total radiated energy at high temperature in a single line dependent upon the electronic structure of the material. At short wavelengths, in the ultraviolet region of their spectrum, these rare earth oxides tend to have high emissivity, but these modes are only excited efficiently at extremely high temperature. At the other end of the spectrum in the far infrared, there is little energy emitted even though there is high emissivity. Consequently, at the temperatures contemplated within this application the emissivity of these materials is effectively low except at the particular line frequency, or more correctly over a narrow bandwidth centered at the line frequency in question. As a result, the radiative characteristics of the rare earth oxides are narrow band emissions rather than a broad band continuum superimposed upon a line spectrum.

TABLE 1

Radiative Characteristics of Potential Rare Earth Emitters

| Element | Electronic Transition | Photon Energy (eV) | Bandwidth ($\Delta E_g/E_g$) | Maximum Efficiency (%) | Approximate Temp at Max. Eff (K) |
|---|---|---|---|---|---|
| Yb | $^2F_{5/2} \rightarrow {}^2F_{7/2}$ | 1.29 | 0.18 | 70 | 3000 |
| Er | $^4I_{13/2} \rightarrow {}^4I_{15/2}$ | 0.83 | 0.05 | 55 | 2000 |
| Ho | $^5I_7 \rightarrow {}^5I_8$ | 0.62 | 0.10 | 72 | 1500 |
| Nd | $^4I_{13/2} \rightarrow {}^4I_{9/2}$ | 0.50 | 0.15 | 55 | 1400 |

The line emission from the elements should be at the following wavelengths respectively: Nd—2.5 microns; Ho—2.0 microns; Er—1.5 microns; Yb—0.95 microns. Note that some of these materials approach maximum efficiency at temperatures well within the range of those already in use in the industry. Theoretical analysis indicates that the optimum geometry for radiators is the form of a fiber or small particle with a thickness on the order of, or less than, the optical depth at the line frequency. (The "optical depth" is in this case defined as the depth where the probability that a quantum of energy, E, will be absorbed is 50%.) The advantage of thin fibers and small particles is in their small optical thickness. Small fibers and particles effectively limit off-band absorption and emission, characteristic of free carrier absorption and lattice defects. Prior measurement of emittance for some of the rare earth oxides at their characteristic wavelength indicates a value in the 0.4–0.6 range, suggesting that large area samples of such materials may be industrially useful.

The use of rare earth oxides as selective line emitters in energy conversion has been recognized for some time, especially in thermovoltaic conversion, i.e., the conversion of thermal to electrical energy, where the relatively efficient, narrow-band infrared emission of the rare earth oxides resulting from a high-temperature environment has been used as the radiation source for a photocell sensitive to the emission bandwidth. Although initial attempts to utilize the favorable properties of the rare earth oxides in thermovoltaic conversion were plagued by low efficiencies, little better than that of a pure black-body radiator, Nelson recognized that the problem was inherent to the monolithic ceramic structures used rather than to the oxides per se. C. R. Parent and R. E. Nelson, "Thermovoltaic Energy Conversion with a Novel Rare Earth Oxide Emitter;" in 1986 *Intersociety Energy Conversion Engineering Conference, San Diego, Calif., Aug. 25–29, 1986; Proceedings*, Paper 869299. Using ceramic fibers Nelson was able to reduce the off-band radiation and thereby increase considerably the efficiency of energy conversion within the relatively narrow emission bandwidth.

Parent and Nelson made their fibrous emitters by impregnating cellulosic yarns with an ytterbium or erbium salt, and then applying controlled heat treatment to burn out the cellulosics and convert the salts to their oxides in a process reminiscent of the preparation of a Welsbach mantle. See U.S. Pat. No. 4,584,426 for a detailed description of the heat treatment. Although the foregoing represented a substantial advance in the utilization of rare earth oxides as selective infrared line emitters in energy conversion many limitations remained. In particular, the fibrous emitters described have limited mechanical strength, and because there is substantial (90%!) shrinkage of the preform during heat treatment fabrication of shaped articles is difficult if not impossible. What are needed are robust, large area samples of rare earth compounds, particularly the oxides, which can be fabricated as small fibers to efficiently convert thermal energy to infrared radiation.

We provided a solution to these needs in U.S. Pat. No. 5,447,786,where we taught a non-woven composite of rare earth metal oxides dispersed and interlocked in a network of fibers having an emissivity less than 0.1 at wavelengths between 0.7 and 5 microns. We have found such materials extraordinarily useful and quite valuable in many applications. Continued use also suggested in some applications the brittleness and low tensile strength of our composites was an undesirable limitation, and that the value and extent of use of our composites would be enhanced considerably if the foregoing limitations were overcome. Accordingly, we have found that some procedurally relatively simple modifications to our materials affords relatively enormous benefits in lowering brittleness and increasing the tensile strength of our infrared emitters.

SUMMARY OF THE INVENTION

The purpose of this invention is to make available as articles of manufacture improved materials which efficiently convert thermal energy to narrow bandwidth emissions in the infrared portion of the spectrum and which are less brittle but have greater tensile strength than our prior art materials. In one embodiment the selective infrared line emitters of our invention comprise a composite of rare earth metal oxide fibers interlocked in a network of alumina fibers with the two types of fibers being adhesively joined by an appropriate ceramic compound formed by a sol-gel process. In a more general embodiment the selective infrared line emitter is a composite of rare earth metal particulates dispersed and interlocked in a network of alumina fibers whose emissivity within the region of 0.7–5 microns is less than about 0.1, where the alumina fibers of the network are joined at a multiplicity of crossing points by being either friction-locked or adhesively joined by an appropriate ceramic material, and where the particulates and fibers are adhesively joined at a multiplicity of sites by an appropriate ceramic compound formed by a sol-gel process. Other more specific embodiments will be apparent from the ensuing discussion.

DESCRIPTION OF THE INVENTION

The needs for conversion of thermal energy to other forms of energy are many and varied. Although solutions exist in principle, few are practical in the context of effecting energy conversion with good efficiency at commercially significant power levels. The use of materials which selectively emit narrow bandwidth infrared radiation upon thermal excitation affords a promise not met prior to U.S. Pat. No. 5,447,786 because the requisite structures were frail, easily damaged by impact or vibration, and of relatively low power. In the cited patent we described composites which are selective infrared line emitters and which can be readily shaped, molded, and scaled to afford robust articles capable of commercially significant power output. The articles described therein ought to be capable of operation even at temperatures up to about 2500° C., can be fabricated with a host of materials to "tune" the output frequency, and articles with multiple selective output frequencies in the infrared with relative intensities at each frequency suitable for a particular operation are eminently feasible. In this application we describe an improvement upon our earlier invention. The improvement is in selective infrared line emitters which are less brittle and which have greater tensile strength than our earlier materials, thereby affording even more robust materials, and in the procedure for making them. The improvement arises from "gluing" alumina (as representative of structural fibers) and carbon fibers in a precursor of the final article of manufacture, so as to ultimately afford a product where the association of rare earth metal compound particulates and alumina fibers leads to the improved properties noted above.

The articles which are our invention are selective infrared line emitters and are a composite of rare earth metal compounds as particulates, especially as fibers, dispersed and interlocked in a network of structure-forming fibers having an emissivity less than about 0.1 over a broad range of wavelengths on either side of the peak emission, where the structure-forming fibers are connected at those crossing points within the network where they are in contact either by a physical bond formed by a ceramic compound or by being friction-locked. Much pertinent to the present invention has been described in U.S. Pat. No. 5,447,786, all of which is hereby incorporated by reference. Consequently, only a brief recapitulation will be given here.

The structure-forming fibers of our composites have a low emittance, up to 5 microns, a total emittance which decreases with increasing temperature, high reflectance and mechanical strength, and good physicochemical stability at high temperatures. Representative materials which can be used as the structure-forming fiber of this invention include alumina, silica, yttrium oxide, and zirconium oxide, with alumina highly favored. In the ensuing description alumina fibers will be used in a representative capacity.

The purpose of the structure-forming alumina fibers in our composite is to provide mechanical integrity and strength to the article, i.e.,to provide an overall physical structure and framework to hold the radiating material in place. To achieve this the alumina fibers are connected at a multiplicity of their junctions, i.e., at those crossing points where the alumina fibers are in contact with each other. For the purpose of our invention the alumina fibers are connected by being either friction-locked or physically connected via a ceramic compound. By "friction-lock" is meant an intermeshing of the structure-forming fibers which are held together by their mutually rough surfaces coming into contact and impeding one sliding over the surface of the other.

The alumina fiber needs to have a low emissivity, not more than about 0.1 within the range of 0.7–5 microns, which is the spectral range of interest. Material which has a low emissivity is not a good black-body radiator. Consequently, it will not dissipate a significant fraction of thermal energy as black-body radiation and allows more efficient conversion of thermal energy into selective infrared radiation. We note that smooth surfaces have a lower emissivity than do rough surfaces. Since rough surfaces are necessary for fibers to be friction-locked, it therefore follows that the use of friction-locking as a means of connecting to fibers results in an increase in undesirable black-body radiation.

The other components in our composites are infrared radiators. In a particularly important variant of our invention the other components are fibers of rare earth metal compounds. The latter materials share the common characteristic of having a line emission (i.e., a narrow bandwidth) in the infrared spectrum between about 0.7 and about 5 microns, arising from an electronic transition of an inner shell, non-valence electron. Because the electronic transition giving rise to the line emission arises from an inner shell electron, the wavelength or frequency of the line emission is a function solely of the rare earth metal, largely independent of both the particular rare earth compound and the oxidation state of the rare earth metal. Even though emissivities of various rare earth metal oxidation states and rare earth metal compounds may differ, it follows that different compounds of the same rare earth metal afford approximately the same line emission in the infrared.

The rare earth metals which may be used in the practice of our invention include cerium, praseodymium, neodymium, samarium, europium, gadolinium, terbium, dysprosium, holmium, erbium, thulium, ytterbium, and lutetium. Since the infrared emissions of interest here are stimulated at high temperatures, the rare earth metal compounds in the composite need to maintain their physical and structural integrity at high temperatures, especially in an oxidizing environment. Therefore the rare earth metal compounds of particular interest are the oxides, carbides, borides, and nitrides, and among these the oxides are of particular utility because of their broad availability. Among the rare earth metals whose compounds are preferred at this time in the practice of this invention are holmium, erbium, neodymium, thulium, and ytterbium.

The rare earth oxide fibers are readily formed by burning out a high surface area carbon fiber impregnated with a rare earth nitrate or other suitable compound. The high surface area carbon fibers are present in an intermediate composite along with the alumina fibers described above and serve as a template for the rare earth oxide fibers. The carbon fibers are subsequently burned out or gasified under conditions where the rare earth compound impregnating the high surface area fiber is converted to the oxide. The resulting rare earth oxide fiber mimics the structure of the high surface area fiber with attending control of the size and surface area of the rare earth oxide fiber, which desirably enhances its emissivity. By "high surface area" is meant a surface area of at least 200 $m^2/g$, preferably at least 500 $m^2/g$, and even more desirably at least about 750 $m^2/g$. Carbon fibers with a surface area of over 1000 $m^2/g$ have been used quite successfully.

The foregoing description was applicable to rare earth metal oxide fibers, but where the composite of our invention has rare earth metal nitride, carbide, or boride fibers the description is inapt. For the nitrides, carbides, or borides the fibers may be used directly, instead of being formed in situ. The diameters of the fibers used in the practice of this invention are largely dependent on commercial availability, ease of preparation, and cost rather than any theoretical or practical limitation. Diameters in the range of 5–50 microns are quite acceptable. The rare earth metal compound present in the composites of our invention is between about 1 weight percent up to as high as about 99 weight percent. The particular amounts of alumina fibers and rare earth metal compounds that may be utilized in the composites depend sensitively on the application and can be readily determined by the skilled worker. On the other hand, this implies that the final composite can be tailored to the particular use envisioned, which is a substantial advantage of our invention.

Selective line emitters have the property that a substantial fraction of the emission observed on heating is in a narrow wavelength centered around the energy associated with a specific electronic transition characteristic of the electronic structure of the rare earth metal. This property can be used to produce a large surface infrared light source for a variety of applications. The primary drawback to the use of these materials is their weakness and the need to form fibrous structures to enhance the radiation. This invention provides a composite of rare earth oxide fibers and high strength, optically suitable, fibers such as alumina which give the composite unique properties both in strength and optical spectra. The process for making the composite uses well known papermaking technology to produce large area, inexpensive, and homogenous emitters. Numerous fibers such as quartz, nextel, etc. will serve as the strengthening fiber. The use of bonded alumina fibers produces a composite which can withstand high temperature better than any other fiber investigated. The fibers in the final composite can be mechanically interlock bonded (friction) or a chemical bond can be produced by adding a step to the manufacturing process. Mechanical interlock bonding is best accomplished with long fibers which are able to make multiple contacts with adjacent fibers and is best suited to thick emitters. The preferable technique is to produce as a bonding agent a ceramic compound in situ which will form a strong physical bond at the junctions of fibers within the composite. If judiciously chosen, the solution affording the ceramic material will concentrate at the fiber junctions and produce a bond by chemically interacting with the fibers. Composites produced in this manner are superior in strength to any process investigated in our laboratory. The bonding agent must be chosen such that its reaction with the strengthening fibers and the rare earth fibers produces little or no out-of-band radiation. The bonding agent, at high temperatures and after the appropriate heat treatment may also form a compound with both the rare earth fiber and the strengthening fiber on the surface as well as at the points where the fibers touch. To take advantage of this, care must be taken in the concentration of the bonding agent and the processing which must be done to produce the bond.

The composites of our invention can be made by a relatively straightforward, uncomplicated method generally applicable to many types of materials. The fibers, and other components where present, are dispersed in a fluid medium along with a matrix-forming agent. The resulting dispersion is then cast into a predetermined shape, treated with ceramic sol gel to adhesively join the carbon and alumina fibers, and the cast dispersion is heated. Substantially all of the matrix-forming agent is then removed, often as an incident to bonding of the fibers via the ceramic material. Impregnation of the carbon fibers with a rare earth metal compound may be effected either prior to, or subsequent to, removal of the matrix-forming agent. Our method is extraordinarily flexible and broadly applicable as to the kinds of fibers which may be used in its practice. It also exhibits virtual universality as to the resulting shape of the finished article, and in fact net-shaped or near net-shaped articles may be readily made, i.e., the shape and size of the finished article is very close to that of the cast dispersion prior to heating.

The alumina fibers, the carbon fibers, and the rare earth metal compounds which may be used in this invention already have been adequately discussed, obviating the need for further description. The alumina fibers and the high surface area fibers serving as a template for rare earth oxide fiber formation are dispersed in a fluid medium, along with any other optional components, by suitable means. It is not essential to have an absolutely uniform dispersion, although often such uniformity is desirable. Dispersion may be effected by such means as sonication, agitation, ball milling, and so forth. The purpose of the liquid is merely to facilitate effective dispersion of the solids, especially where one wants as uniform a dispersion as is feasible in the final preform. Since the liquid is later removed it is clear that it should be readily removable, as by volatilization. Water is normally a quite suitable liquid, although water-alcohol mixtures, and especially water-glycol mixtures, may be used. Illustrative examples of other liquids include methanol, ethanol, propanol, ethylene glycol, propylene glycol, butylene glycol, poly(ethylene glycol)(s), poly(propylene glycol)(s), and so forth. Other organic liquids also may be used, but normally without any advantages. Since water is by far the most economical and most universally available liquid it is the one of choice in the practice of our invention. While some mixtures of the above noted liquids may be used to adjust the viscosity of the dispersion so that filtering or settling onto a screen or filter provides a certain degree of uniformity within the "wet" preform regardless of the densities and drag forces acting on the various particulates, still other additives including surfactants and dispersing agents can be used to assist in the mixing process. We emphasize again that the liquid functions only as a medium facilitating the dispersion of materials in preparing the preforms.

A preform is the solid containing the non-woven dispersion of the alumina fibers, the high surface area fibers serving as a template for the rare earth metal compounds, any other optional components, and a matrix-forming agent. The matrix-forming agent provides a solid matrix in which the other components are dispersed; its purpose is to permit the fabrication of a solid preform containing an otherwise structurally unstable dispersion of elements of the final composite where the preform can be shaped, stored, and otherwise handled prior to creation of an interlocked network via physical bonding or friction-locking the alumina fibers at their junctions. The matrix-forming agent merely provides a stable, although relatively weak, physical structure which maintains the spatial relationship of components of the composite prior to the latter's formation. Although the preform is only a temporary structure, it is an important one in the fabrication of the composite.

The matrix-forming agent is chosen to volatilize at least to the extent of 99 weight percent, under conditions which are neither chemically nor physically detrimental to other components in the final composite. The matrix-forming agent has no function in the final composite and may interfere with infrared emissions, consequently its presence should be minimized in the final composite. However, it can be used to control the composite's porosity for gas flow with a combustion flame as a heat source. Among the matrix-forming agents which may be used in the practice of this invention are cellulose, organic resins such as polyvinyl alcohol, polyurethanes, and styrene-butadiene latex, and thermosets such as epoxies, urea-formaldehyde resins, melamine-formaldehyde resins, and polyamide-polyamine epichlorohydrin resins. Cellulose, in all its forms and modifications, is by far the most desirable matrix-forming agent because it volatilizes completely at relatively low temperatures with little ash formation, is unreactive toward other components in the preform, and is readily available. In particular, the cellulosic materials typically used in the paper-making process are especially favored; the skilled worker will readily recognize the elements of the paper-making process in the foregoing description.

The matrix-forming agent is present in the preform at a range from about 2 to about 90 weight percent. The minimum amount of matrix-forming agent is that which is necessary to give a stable preform, that is, one which can be handled, shaped, and so forth, an amount which depends upon fiber and particulate loading, fiber size, and so forth. Using cellulose as a matrix-forming agent as an example, a range from about 10 to about 60 weight percent of cellulose in the preform is typical.

After the dispersion of components and matrix-forming agent in a liquid is attained, the solids are collected, as on a mat. Excess liquid may be removed, such as by pressing, and the resulting solid dispersion often is dried (i.e., liquid is removed), especially where it is to be stored prior to further treatment. Where a thermosetting matrix-forming agent is used, the temperature of drying is important. But in the more usual case there is nothing particularly critical in the drying process, and drying may be performed in air, under elevated temperatures, or in a flowing gas. The mass also may be compacted under pressure to a greater or lesser extent.

The dispersion may be cast into a predetermined shape prior to, coincident with, or after drying, with the last named procedure the one most commonly employed. The preform resulting from drying is generally quite flexible and adaptable to shapes of various sorts. Often it is quite convenient to cast the dispersion into sheets which can then be rolled up and stored prior to subsequent treatment. The sheets can be stored for long periods of time, can themselves be cast into near net-shaped bodies, and can be used onsite for the fabrication of various articles. Various types of preform sheets may be stacked upon one another to create thicker composites. Alternatively, different shaped preform sheets may be stacked so as to form both two and three dimensional structures for various applications.

After formation of the preform it is treated with a suitable ceramic compound precursor as the prelude to adhesively joining or connecting the alumina fibers; for convenience we shall refer to the ceramic compound precursor as a binder. Optionally, the carbon fibers of the preform also may be impregnated with a rare earth compound, before or after treatment with the binder, or impregnation may be effected after removal of the matrix-forming agent; vide infra. Typically, one utilizes sol-gel technology to treat the preform with a suitable ceramic precursor, ultimately to form small particles of a ceramic compound which can be sintered at a temperature significantly lower than that usually associated with ceramic densification. During gel formation the particles of the ceramic precursor tend to concentrate at the fiber junctions because of capillary action. During subsequent sintering of the particles the fiber junctions become enmeshed or encased in the formed ceramic resulting in a structure where the fibers are physically joined or connected at their junction.

Although the means by which the fibers are joined or connected as mediated by the binder or its predecessors have not been determined with precision, we have developed a theoretical framework which appears to account for the observed results. In particular it is believed that upon gelation (vide infra) of the ceramic compound precursor there is physical bonding of the structural fiber and carbon fiber arising from the gel structure and subsequent particulate formation. During later high temperature treatment in the presence of rare earth nitrates the ceramic is sintered, the nitrates are converted to rare earth oxides, and from the phase diagram of, e.g., erbium oxide and aluminum oxide, it is believed that compound formation occurs between the rare earth oxide and ceramic. It is believed that this combination of physical attachment and reaction serves to bind the rare earth oxide and structure-forming oxides to afford a mechanically stronger, less brittle composite than previously obtained.

In greater detail, sol-gel techniques utilize stable dispersions of hydrous oxides or hydroxides, often in a mixed aqueous-organic solvent system, as reactants which are induced to polymerize, ultimately affording fine, reactive ceramic precursor particles which undergo sintering at temperatures much below that of conventionally prepared powders. One common class of sol-gel processes uses alkoxides of, e.g., silicon, boron, titanium, or aluminum as starting materials. These are initially dissolved in a suitable alcohol, and upon addition of water, and frequently an acidic or basic catalyst, undergo polymerization via condensation of the hydroxyl groups to form M-O-M linkages, where M is the metal in the alkoxide. The polymeric chains branch and cross-link, eventually forming a gel consisting of a network of high molecular weight inorganic polymer. Solvent then is removed from the gel, as by evaporation or supercritical fluid extraction, to afford exceedingly fine, pseudocrystalline, reactive particles which can be readily sintered.

During the sol-gel transformation the polymer tends to concentrate at the fiber junctions by capillary action. Once the concentration process is initiated it tends to become accentuated during gelation, since polymerization and nucleation are preferred at sites of higher local concentration. Thus, a natural result is accumulation of particles at fiber junctions—in the extreme, formation of a shell of such particles around the fibers at the junction—which during subsequent sintering leads to the junction being (wholly or partially) "encased" in a ceramic shell. It is clear this leads to fibers being physically linked in a stable structure.

Although the foregoing description was that for a sol-gel process beginning with metal alkoxides, the latter are not required precursors. For example, alumina can be made via a sol-gel process utilizing aluminum chloride, or aluminum chlorohydrates, which undergo polymerization upon treatment with base. The sol-gel technique is widely known; the skilled artisan will know of the various methods and variants available for particular metal oxide preparation. See, e.g., "Sol-Gel Processing and Applications," Yosry A. Attia, Plenum Press, New York (1994). Similarly, the technique is not restricted to oxides of silica, boron, titanium, and aluminum, for it is equally applicable to the preparation of oxides of zirconium and yttrium as well as the preparation of mixed metal oxides (e.g., silica-alumina).

Examination of the final composites of our invention by electron microscopy clearly supports the foregoing interpretation. The photomicrographs show ceramic particles concentrating at and around fiber junctions, in some cases providing a shell or glaze which nearly encases the junction. The photomicrographs also show many ceramic particles on the fibers remote from their junctions, but these are not involved in physically linking the fibers.

The preform or the cast dispersion is heated which serves to remove the matrix-forming agent and to sinter the ceramic precursor particles formed in the sol-gel process. Frequently the preform is subjected to a 2-stage heating process. In the first stage the preform is heated at a temperature sufficient to volatilize the matrix-forming agent. In the most common case where the latter agent is cellulose heating to a temperature of not more than about 650° C. is sufficient to volatilize at least 99 weight percent of the cellulose. The preform then is heated to a temperature sufficient to sinter the ceramic precursor particles. In the case of alumina particles, a sintering temperature of 1400°–1500° is adequate. In a preferred mode, the carbon fibers of the preform are impregnated with a rare earth compound, such as a rare earth nitrate, and when the preform is heated in air at a temperature in the range of 1000°–1500° C. there occurs concurrently sintering of the ceramic precursor particles, conversion of the rare earth compound to its oxide, and oxidative removal of the carbon fibers to afford the final composite.

Alternatively, after removal of the matrix-forming agent, and if the high surface area fibers have not already been impregnated with a rare earth compound, the resulting matrix of structure-forming fibers and high surface area fibers may be soaked in a solution of a suitable rare earth metal compound to impregnate the high surface area fibers; the final amount of the rare earth oxide is determined by the concentration of this solution. The matrix is dried and then heated in air to oxidize the high surface area fiber, to convert the rare earth metal compound to a solid oxide which mimics the large surface area fiber, and to sinter the particles of ceramic precursor. The result once more is the final composite of our invention.

The following example is merely illustrative and representative of the preparative methods used in preparing the composites of our invention.

Paper processing. A combination of ceramic fiber, activated carbon fiber, and cellulose was used to make the preform as illustrated by the following specific preparation. Into one blender was placed 2.5 cups of water and the pH was adjusted to 4 using nitric acid. Cellulose (2.5 g) was added and the mixture blended on the highest speed for 10–20 minutes. Into a second blender was poured 1.5 cups of water and the pH was adjusted to 4 with nitric acid. Activated carbon fiber (3.5 g of 10 nm diameter fibers, 2000 $m^2/g$ was placed in the second blender and stirred on low speed for 10 minutes. The slurry from each blender was combined while alumina fibers were added (5 g of 12 micron diameter) and stirred for an additional 15 minutes on the lowest speed. A wire screen then was placed in a casting mold which was filled with 3 gallons of water with the pH adjusted to 4. The slurry was poured into the water, agitated for 5 minutes, and the water thereafter drained from the sheet mold. The paper then was dried at 100° C. for 30 minutes. The purpose of controlling the pH in the distilled water is because the isoelectric point for alumina is about 8 and a pH of 4 can give a higher zeta potential on the alumina fiber surface, which leads to fiber separation. Therefore, uniformly distributed fibrous paper can be manufactured in the pH is controlled.

Bonding the fibers. To form a strong fibrous emitter, the fibers need to be bonded to each other. The following bonding solution is exemplary of that which may be used to bond the fibers. A mixture of 30 grams distilled water at 90° C. and 6.16 g aluminum sec-butoxide were mixed and stirred for 15 minutes. A second solution containing 0.38 grams aluminum nitrate in 20 grams of water at 80° C. was added to the foregoing solution and the resultant mixture was stirred at 90° C. until it was clear (about 20 hours). The solution then was cooled to room temperature and was ready for use. The solution contained 50–80 nm hydrated aluminum oxide particles. The fibrous paper prepared as described in the prior paragraph was impregnated with the bonding solution with gelation occurring subsequent to impregnation, and the paper was subsequently dried in an oven (about 90° C.) for approximately 1 hour to evaporate water and organic solvent. Subsequently, the dried paper was impregnated with a 3 molar rare earth nitrate and dried in an oven at 100° C. for 2 hours to evaporate water from the paper.

Reaction sintering. The paper containing the rare earth nitrate and bonding solution then was sintered at the following schedule: 10° C./min. to 650° C. and hold for 1 hour; 10° C./min. to 1300° C. and hold for 0.5 hr; heating at 10° C./min. to 1500° C. and hold for 2 hours. The carbon and cellulose were burned out completely at 400° C. after 1 hour. The complete thermal decomposition of the nitrates used as rare earth oxide precursors was observed at 650° C. by thermogravimetric analysis. After pyrolysis at 650° C., successive steps of heat treatments were used to improve the binding strength among fibers and crystallinity in density rare earth oxide fibers which were left after the carbon was burned away.

The purpose of using a ceramic "glue" in emitter processing is to improve the bonding strength between the fibers (both the structural fibers, i.e.,alumina, mullite, and quartz, and rare earth fibers, e.g.,erbium oxide, thulium oxide, and so forth) which eventually results in an overall strength improvement for the emitters. The ceramic precursor particles in the gel selectively accumulated fiber joint points where the capillary force is larger. The absorbed particles subsequently bond the fibers during later densification while the particles convert to their oxide forms during the sintering process.

What is claimed is:

1. A selective infrared line emitter comprising a nonwoven composite of fibers of at least one rare earth metal oxide and at least one structure-forming material selected from the group consisting of alumina, silica, yttrium oxide and zirconium oxide, where the rare earth metal oxide fibers are dispersed and interlocked in a network of the structure forming fibers, and where the fibers are adhesively connected at a multiplicity of crossing points by a ceramic bonding agent.

2. The selective infrared line emitter of claim 1 where the rare earth metal is selected from the group consisting of ytterbium, erbium, holmium, and neodymium.

3. The selective infrared line emitter of claim 1 where the rare earth metal oxide is ytterbium oxide.

4. The selective infrared line emitter of claim 1 where the rare earth metal oxide is erbium oxide.

5. The selective infrared line emitter of claim 1 where the rare earth metal oxide is holmium oxide.

6. The selective infrared line emitter of claim 1 where the rare earth metal oxide is neodymium oxide.

7. The selective infrared line emitter of claim 1 where the structure-forming fiber is alumina.

8. The selective infrared line emitter of claim 1 where the rare earth metal oxide fibers and the structure-forming fibers have a diameter between about 5 and about 50 microns.

9. The selective infrared line emitter of claim 7 where the rare earth oxide fibers have a diameter between about 5 and about 30 microns.

10. The selective infrared line emitter of claim 1 where the ceramic bonding agent is selected from the group consisting of alumina, silica, boria, titanium zirconia, and yttria.

11. The selective infrared line emitter of claim 10 where the ceramic bonding agent is alumina.

12. An article of manufacture which is a selective infrared line emitter comprising a composite of a) particulates of at least one rare earth metal oxide having selective line emissions in the infrared within the wavelength region of 0.7 to about 5 microns dispersed and interlocked in b) a network of structure-forming fibers, said fibers having an emissivity within said wavelength region of less than 0.1, said network having junctions where said fibers are in contact, where a multiplicity of said junctions are connected by a ceramic bonding agent.

13. The article of manufacture of claim 12 where the particulates are fibers of rare earth metal oxides.

14. The article of manufacture of claim 12 where the structure-forming fibers are selected from the group consisting of alumina, zirconium oxide, silica, yttrium oxide, and any combination thereof.

15. The article of manufacture of claim 12 where the rare earth metal is selected from the group consisting of ytterbium, erbium, holmium, and neodymium.

16. The article of manufacture of claim 12 where the rare earth metal oxide is ytterbium oxide.

17. The article of manufacture of claim 12 where the rare earth metal oxide is erbium oxide.

18. The article of manufacture of claim 12 where the rare earth metal oxide is holmium oxide.

19. The article of manufacture of claim 12 where the rare earth metal oxide is neodymium oxide.

20. The article of manufacture of claim 12 where the structure-forming fiber is alumina.

21. The article of manufacture of claim 12 where the rare earth metal oxide fibers and the structure-forming fibers have a diameter between about 5 and about 50 microns.

22. The article of manufacture of claim 20 where the rare earth oxide fibers have a diameter between about 5 and about 30 microns.

23. The article of manufacture of claim 12 where the ceramic bonding agent is selected from the group consisting of alumina, silica, boria, titanium zirconia, and yttria.

24. The article of manufacture of claim 12 where the ceramic bonding agent is alumina.

* * * * *